United States Patent
Spitsberg et al.

(10) Patent No.: US 6,607,852 B2
(45) Date of Patent: Aug. 19, 2003

(54) ENVIRONMENTAL/THERMAL BARRIER COATING SYSTEM WITH SILICA DIFFUSION BARRIER LAYER

(75) Inventors: Irene Spitsberg, Loveland, OH (US); Hongyu Wang, Niskayuna, NY (US); Bangalore Aswatha Nagaraj, West Chester, OH (US)

(73) Assignee: General Electric Company, Schenectady, NY (US)

( * ) Notice: Subject to any disclaimer, the term of this patent is extended or adjusted under 35 U.S.C. 154(b) by 87 days.

(21) Appl. No.: 09/894,249

(22) Filed: Jun. 27, 2001

(65) Prior Publication Data

US 2003/0003328 A1 Jan. 2, 2003

(51) Int. Cl.[7] .............................. B32B 9/04; F03B 3/12
(52) U.S. Cl. ........................ 428/702; 428/212; 428/334; 428/697; 428/698; 428/699; 428/701; 428/446; 416/241 B
(58) Field of Search ............................... 428/408, 446, 428/701, 702, 698, 697, 699, 700, 220, 212, 334, 335, 336; 416/241 B

(56) References Cited

U.S. PATENT DOCUMENTS

| | | | |
|---|---|---|---|
| 4,523,554 A | 6/1985 | Ryu | |
| 4,599,256 A | 7/1986 | Vasilos | |
| 4,894,286 A | 1/1990 | Gray | |
| 5,194,330 A | 3/1993 | Vandenbulcke et al. | |
| 5,246,736 A | 9/1993 | Goujard et al. | |
| 5,305,726 A | 4/1994 | Scharman et al. | |
| 5,536,574 A | 7/1996 | Carter | |
| 5,622,751 A | 4/1997 | Thebault et al. | |
| 5,677,060 A | 10/1997 | Terentieva et al. | |
| 5,741,596 A | 4/1998 | Skowronski et al. | |
| 5,776,550 A | 7/1998 | Disam et al. | |
| 5,869,146 A | 2/1999 | McCluskey et al. | |
| 5,958,578 A | 9/1999 | Blohowiak et al. | |
| 5,965,266 A | 10/1999 | Goujard et al. | |
| 5,985,470 A | 11/1999 | Spitsberg et al. | |
| 6,129,954 A | 10/2000 | Spitsberg et al. | |
| 6,296,942 B1 | * 10/2001 | Eaton, Jr. et al. | |
| 6,444,335 B1 | * 9/2002 | Wang et al. | |

* cited by examiner

*Primary Examiner*—Deborah Jones
*Assistant Examiner*—Jennifer McNeil
(74) *Attorney, Agent, or Firm*—David L. Narciso; McNees, Wallace & Nurick

(57) ABSTRACT

Improved adhesion of thermal barrier coating systems to nonmetallic substrates using a layer of silica on an underlying nonmetallic substrate that includes a silicon containing material is described. The improved adhesion occurs because the improved thermal barrier system improves the temperature capability of the system by providing a layer adjacent the substrate that has improved thermal performance and that is not subject to deterioration. The application of a silica layer of predetermined thickness adjacent the substrate also forms a diffusion barrier for oxygen while eliminating the need to transform an external layer of the substrate by a pre-oxidation step. This diffusion barrier prevents any oxidizable component of the substrate from decomposing. The thermal/environmental barrier coating (T/EBC) system includes an intermediate layer containing YSZ and BSAS, mullite and/or alumina, which is preferably used in combination with a mullite layer that overlies the surface of the silica layer, a layer of BSAS between the mullite layer and the intermediate layer, and a thermal barrier coating of YSZ overlying the intermediate layer.

26 Claims, 1 Drawing Sheet

ENVIRONMENTAL/THERMAL BARRIER COATING SYSTEM WITH SILICA DIFFUSION BARRIER LAYER

BACKGROUND OF THE INVENTION

The present invention relates generally to coating systems and more specifically to the protection of silicon containing materials, such as ceramic matrix composites (CMC's), in hot, oxidizing environments, such as the combustor or turbine portion of gas turbine engines.

Higher operating temperatures for gas turbine engines are continuously sought in order to improve their efficiency. However, as the operating temperatures increase, the high temperature durability of the components of the engine must also correspondingly increase. Materials containing silicon, particularly those with silicon carbide (SiC) as a matrix material and/or as a reinforcing material, are currently being used for high temperature applications, such as in the components for the combustor and/or turbine sections of gas turbine engines.

Silicon carbide (SiC) has a tendency to oxidize into silica ($SiO_2$) and $CO_2$ at elevated temperatures in the presence of $O_2$. Some additional silica may be formed due to the presence of some free silicon. While the silica formed can be an excellent diffusion barrier to prevent diffusion of $O_2$, silica is itself subject to deterioration in the presence of water or vapors of water such as steam. Thus, while coating systems have been used to provide some protection for the SiC in high temperature environments that include silica, these systems have been ineffective or deficient in some aspect. Either the silica layer that has been provided is very thin and formed by decomposition of the substrate or inadequate protection of the silica layer from a hydrous atmosphere has been provided. When a coating system is utilized for protection of the underlying SiC in hot, oxidizing environments is formed by preoxidation of the SiC substrate, which is not a preferred method because of the length of time required to form a silica layer of sufficient thickness, there is still a tendency for void formation to occur, even when the silica is protected from deterioration from a hydrous atmosphere. The voids may appear in the thin interfacial silica scale formed by the transformation. The voids can also exist at the interfaces between the silica scale and the substrate. The voids are undesirable as they decrease the environmental protection provided by any external coatings. Not only do the voids break down the SiC, which can adversely affect the mechanical properties of the CMC composite, which are designed around the mechanical properties of its system components, but the voids can also provide a path of least resistance that permits the continued inward diffusion of oxygen to promote further deterioration of the SiC composite. The voids can aggregate during the course of operation at high temperatures and can reduce the life of the external coating by promoting spallation of the applied coating. Alternatively, when inadequate protection of the silica layer is provided, the silica layer quickly deteriorates by contact with a hydrous atmosphere such as may be encountered by turbine engines in marine or coastal environments leading to a breakdown of the protective silica layer by the formation of volatile SiO and silicon hydroxide ($Si(OH)_x$) products. This can then result in oxidation of the underlying SiC and rapid deterioration of the substrate in a hydrous oxidizing environment as the SiC decomposes and as any $SiO_2$ formed during the decomposition of the SiC also decomposes. Thus, any coating system applied to the silicon-containing material should provide environmental protection by inhibiting the degradation of the silicon containing material in a water-containing or steam-containing environment. Thus, a dense layer of silica is effective in protecting a silicon-containing substrate from oxidation only so long as the silica layer is not itself degraded in a hydrous environment, such as those in which gas turbines frequently operate.

Various coating systems are available for the protection of silicon containing materials, such as silicon carbide systems, from oxidation at high temperatures and degradation in a water-containing environment. One type of coating system is discussed in U.S. Pat. Nos. 6,129,954 to Spitsberg et al. and 5,869,146 to McCluskey et al., which disclose techniques for applying a mullite ($3Al_2O_3.2SiO_2$) coating to a silicon-based ceramic substrate. The mullite coating is used as a thermal barrier coating (TBC) for the silicon-based ceramic substrate. The mullite coating can also serve as a bond coat for the subsequent application of an environmental barrier coating (EBC) such as yttria-stabilized zirconia (YSZ) as there is a mismatch between the coefficients of thermal expansion of YSZ and silicon carbide. However, mullite does not provide adequate protection in high temperature environments containing water vapors because mullite has, thermodynamically, significant silica activity due to the high concentration of $SiO_2$ in mullite, and volatilizes at high-temperatures in the presence of water or water vapor. Another coating system is discussed in U.S. Pat. No. 5,985,470 to Spitsberg et al., which discloses a thermal/environmental barrier coating system for a silicon-based ceramic substrate. The coating system includes a layer of barium strontium aluminosilicate (BSAS), which serves as a bond coat for a ceramic topcoat. The ceramic topcoat can include a zirconia partially or fully stabilized with yttria (YSZ) and yttrium silicate.

Other coating systems have proposed protecting the silicon-containing substrate by providing environmental protection using barium aluminosilicate and variations of this material and intermediate layers between the barrier layer and the substrate to enhance adherence and prevent reactions between the barrier layer and the silicon-containing substrate. The intermediate layers can include a bond coat of silica formed by preoxidation of the silicon-containing substrate or a layer of silicon applied to the substrate followed by application of the intermediate layer by thermal spray. The intermediate layer may be applied without the formation of a bond coat.

Still other coating systems for protecting CMC's against oxidation include the formation of a thin silica layer to the silicon containing material. To provide additional thermal and environmental protection, a mullite coating and a ceramic topcoat of YSZ can be applied to the silica layer. Still other coating systems can apply a layer of silicon onto the silicon-containing material to improve adhesion, followed by additional thermal and environmental barrier coatings that are then applied onto the silicon layer.

Current coating systems are designed for interface temperatures between the protective coating and the substrate of not more than about 2300° F. What is needed is a protective coating system that can increase this interface temperature into the range of about 2400–2500° F. as the temperatures of the turbine are increased by use of a coating sufficiently thick to improve the temperature capability of the coating system, while eliminating components that may experience incipient melting at these elevated temperatures. The protective coating system ideally forms a barrier to diffusion of oxygen to protect the silicon-containing substrate from degradation, yet is stable in high temperature environments containing water molecules and can be selectively applied. The coating system must be easy to apply to the desired thickness and be capable of maintaining its resistance to oxygen diffusion, in the presence of water molecules and at temperatures of up to 3000° F. Most importantly, the material should be also improve the elevated temperature adherence of thermal barrier coatings such as yttria-stabilized zirconia to the silicon containing substrate by providing an intermediate coefficient of thermal expansion (CTE) so that the component to which it is applied can be used in hydrous environments that experience even higher temperatures, while having excellent environmental properties.

SUMMARY OF THE INVENTION

The present invention is directed to a coating system for an article used in a hot section of a gas turbine engine. The article includes a ceramic matrix composite or CMC substrate that is oxidizable or otherwise degradable at elevated temperatures of operation in a corrosive environment. The coating system is comprised of an inner layer of material that has a higher melting temperature than the CMC substrate and a low oxygen permeability, which is applied over the CMC substrate to protect the substrate from oxidation. The coating system also includes an intermediate layer that protects the inner layer from deterioration due to exposure to a hot corrosive hydrous environment while also providing thermal protection. The intermediate layer can consist of at least one material selected from the group consisting of mullite and barium strontium aluminosilicate (BSAS), yttria-stabilized zirconia (YSZ), alumina and mixtures thereof applied over the inner layer and an thermal barrier coating of YSZ applied over the intermediate layer.

The present invention is also directed to a second coating system for an article used in a hot section of a gas turbine engine. The second article includes a CMC substrate formed of a silicon containing material. The coating system includes an inner layer of material, such as silica having a low diffusivity of oxygen and a higher melting temperature than the substrate applied over the composite substrate. The second coating system comprises an intermediate layer that includes a first sublayer of mullite applied over the inner layer, a second sublayer of BSAS applied over the first sublayer, a third sublayer applied over the second sublayer and underlying an outermost thermal barrier coating. The third sublayer consists essentially of a thermal-insulating material and at least one material selected from the group consisting of mullite, alumina and alkaline earth metal aluminosilicates and an outer layer of YSZ.

An advantage of the present invention is that the coating system inner layer forms a protective, diffusion barrier layer over the CMC composite that prevents the diffusion of oxygen through to the CMC. This prevents the deterioration of any materials present in the CMC that are subject to degradation by oxidation at elevated temperatures. The coating system also increases the temperature capability of the coated component by providing a coating system that can withstand elevated interface temperatures and that eliminates components that may exhibit incipient melting at elevated temperatures. When the inner layer is a material that is subject to deterioration in a hydrous atmosphere, the intermediate and outer layers are applied to provide protection from the detrimental effects of the hydrous atmosphere while also providing environmental and thermal protection. As used herein, hydrous environment or atmosphere means an environment or atmosphere that contain water, water vapor or steam.

Another advantage of the present invention is that the coating system is layered in such a manner that adherence of an advanced thermal barrier material to a CMC substrate, typically one containing silicon, is improved. This is accomplished by matching the CTE's of the layer so that cyclic stresses resulting from the temperature gradients due to the high temperatures are reduced sufficiently to provide at least satisfactory life without serious spallation problems.

Another advantage of the present invention is directly related to the ability of the to form a diffusion barrier to inhibit the diffusion of oxygen. Since oxygen cannot penetrate the diffusion barrier layer, the deterioration of the silicon-containing substrate with the accompanying formation of voids at the interface between the substrate and the inner layer or below the interface and within the substrate is prevented. As void formation is related to spalling of materials above the voids, particularly as the voids coalesce, the spalling of the layers is prevented.

Another advantage is that the inner layer is not prone to incipient melting and associated deterioration and can form a strong bond with most non-metallic, CMC engineering materials that can be used as structural components in the hot portions of gas turbine engines. The typical thermal barrier coatings that overly these structural components to improve the components' thermal response are also capable of forming good bonds with the inner layer.

A further advantage of the present invention is that it permits the use of oxidizable composite materials such as SiC and SiN, which do not contain free silicon, as substrates in applications in which the temperature experienced can be above the melting point of silicon, thereby allowing the use of these materials in applications not previously considered. An additional advantage is that metal components currently used in turbine engines can be replaced with lightweight composite components to reduce the weight of the engine, thereby improving specific fuel performance.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
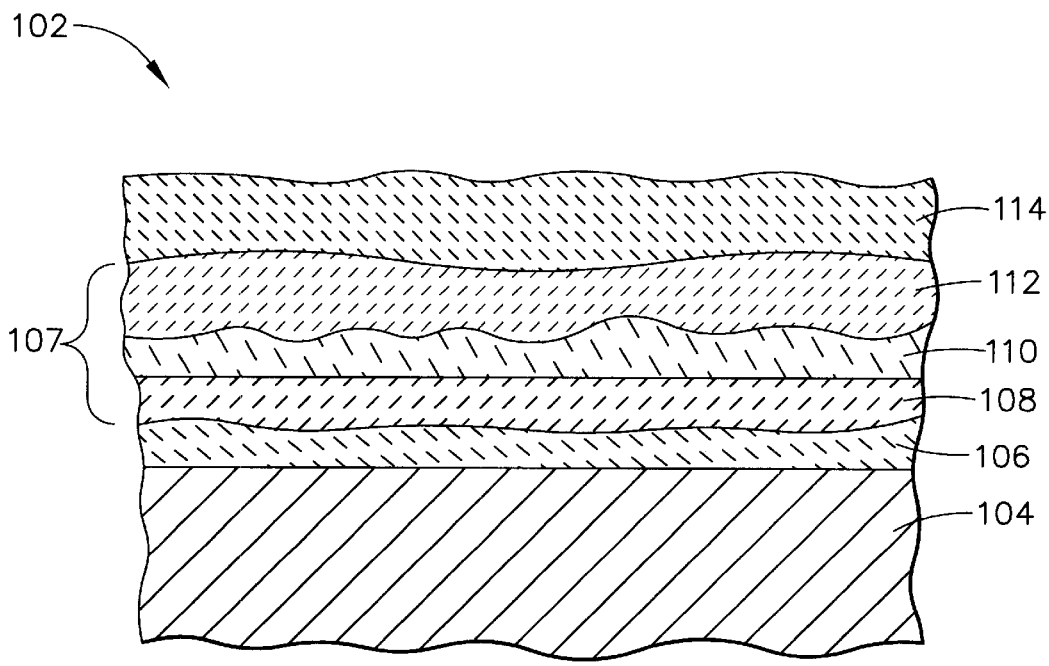
FIG. 1 is a turbine component with one embodiment of the coating system of the present invention.

The present invention provides a coating system with improved adhesion to CMC substrates, particularly those substrates that include silicon or silicon-containing components, while improving the temperature capabilities of the coated substrates up to and even above the melting point of silicon, about 2560° F. The present invention achieves its effective coating without exposing the substrate material to an oxidizing atmosphere during the coating process for prolonged periods of time during the coating process that can result in the formation of voids in the substrate and resultant substrate deterioration in hot environments such as the hot section of a gas turbine engine. FIG. 1 illustrates a turbine engine component 102 with one embodiment of the coating system of the present invention. The turbine engine component 102 has a nonmetallic substrate 104. The nonmetallic substrate 104 typically includes a silicon-containing material and at least one oxidizable component. Typically, the at least one oxidizable component includes at least a carbon-containing material or a nitrogen-containing material. While the nonmetallic substrate 104 can be a monolithic ceramic such as a silicon carbide or a silicon nitride, more typically the nonmetallic substrate 104 is a fiber matrix composite, such as a ceramic matrix composite (CMC), when additional strength is needed, particularly when the additional strength is required as a result of directional stress patterns. The fiber matrix composites may include a wide variety of materials, and may include metallic components in combination with nonmetallic components so that the substrates are not monolithic metallic substrates. These include metal fibers in non-metallic matrices or non-metallic fibers in metallic matrices, and frequently include a carbon-containing material. In the fiber matrix composites, the strengthening fibers are typically comprised of an oxidizable material such as carbon, silicon carbide or silicon nitride, and the matrix is a material selected from the group consisting of metallic materials and ceramic materials which may or may not be oxidizable. Alternatively, the matrix material may be an oxidizable ceramic, such as silicon nitride or silicon carbide matrix, while the fibers may be a material such as a ceramic, sapphire, or a metal. Of course, both the fiber and the matrix may be oxidizable, such as when a component is made from SiC/SiC material comprising a silicon carbide fiber embedded in a silicon carbide matrix.

In order to protect the substrate from deterioration and to provide improved adherence at elevated temperatures, an inner layer of material 106 that has a higher melting temperature than the substrate, but a coefficient of thermal expansion that is compatible with the substrate is applied over the substrate by a process that does not cause substrate deterioration. Preferably the inner layer also has a very low rate of oxygen diffusion to protect the substrate from oxidation as a result of penetration of oxygen through the outer layers of the coating system. This inner layer 106 is preferably a material that is compatible with the substrate, such as silica when the substrate is a silicon containing material. Silica is substantially impervious to penetration by oxygen. This applied inner layer of material 106 differs from material such as a silica formed by thermal decomposition of SiC or SiN by oxidation in that it can be applied to desired thicknesses in only preselected areas relatively quickly and is not as likely to result in undesirable void formation, as the substrate is not altered by its application. This application is unlike the very thin coatings of silica formed by thermal decomposition of a silicon-containing substrate, which also affects the entire substrate. Inner diffusion layer 106 can also be made so as to be substantially crack-free, if desired. The applied inner diffusion layer 106 is chemically compatible with the substrate or matrix 104 so as to form a strong bond with the matrix 104. Inner layer 106 is applied to at least those portions of the turbine engine component 102 exposed to the hot, oxidizable gases of combustion. For example, a turbine component such as a combustor liner only must be coated on that portion of the liner exposed to the hot exhaust gases of combustion.

Inner layer 106 can be applied in different thickness by different processes to achieve different results. Silica and alumina, the preferred materials for the inner layer, are brittle materials and can include cracks, which can provide unwanted diffusion paths for oxygen. As previously noted, the inner layer can be applied by a process that yields a substantially crack-free layer so as to prevent the transfer of oxygen along cracks. This is best achieved by applying a thin layer of silica or alumina by a CVD process or by physical vapor deposition. These processes achieve substantially crack-free densified layers in thicknesses of from about 1 microns to about 125 microns and more typically from about 5–15 microns. When some minor cracking can be tolerated, the densified layer can be applied by plasma spray, sputtering or by the sol-gel process. The sol-gel process can produce a densified layer of from 20–100 microns and more typically from about 20–25 microns, while sputtering and the plasma spray process yields a dense coating having a thickness of about 1–3 mils. It is preferable that the cracks not extend completely across the diffusion layer from the outer surface to the interface with the substrate.

Overlying the inner layer 106 is an intermediate layer 107, which can include up to three sublayers 108–112, and an outermost thermal barrier top coat or layer 114 compatible with the intermediate layer 107. The intermediate layer 107 and thermal barrier top coating 114 act as a multi-layer thermal/environmental coating (T/EBC) system and provide environmental protection to the nonmetallic substrate 104, as well as reduce the operating temperature of the turbine engine component 102, thereby enabling the turbine engine component 102 to survive within higher temperature environments than otherwise possible.

The thermal barrier coating 114 can include zirconia-based coatings stabilized with oxides formed from hafnium and metals of Group IIA elements, Group IIA elements and the lanthanide series elements. The Group IIA elements include but are not limited magnesium, calcium, strontium and barium. The Group III elements include, but are not limited to yttrium and lanthanum. The lanthanide series includes cerium, ytterbium and other elements having an atomic number from 58 through 71. Oxides of these elements, either alone or in combination, can be used to stabilize zirconia-based coatings. A widely used thermal barrier coating is yttria-stabilized zirconia (YSZ), having preferably about 6–8 weight percent yttria, though it is foreseeable that other ceramic materials could be used. A suitable thickness range for the YSZ top coat 114 is about 12.5 to about 1250 $\mu$m (about 0.0005 to about 0.050 inch), with a preferred range of about 125 to about 750 $\mu$m (about 0.005 to about 0.030 inch), depending on the particular application.

The mechanism for the degradation of the silicon component of silicon carbide (as well as silicon and other silicon compounds) in a hot, corrosive hydrous environment is the formation of volatile silicon monoxide (SiO) and silicon hydroxide (Si(OH)x) products, it being understood that carbon will form CO and $CO_2$ upon exposure to an oxidizing environment. The diffusivity of oxidants in the YSZ topcoat 114 is generally very high. Therefore, in order to protect the silicon containing substrate 104, the coating system must include additional layers 106–107 beneath the YSZ top coat 114 that, individually or in combination, exhibit low diffusivity to oxidants (e.g., oxygen) to inhibit oxidation of the silicon carbide within the surface region of the nonmetallic substrate 104 while also being sufficiently chemically and physically compatible with the nonmetallic substrate 104 to remain adherent to the nonmetallic substrate 104 under severe thermal conditions.

The inner layer 106 is comprised of a material that has a low rate of oxygen diffusion and that has a higher melting temperature than the substrate over which it is applied. The inner layer preferably is an oxide, and most preferably is an oxide of silicon. The inner layer preferably is continuous.

Although these oxides are brittle, particularly when thick, a thin, continuous layer of such oxides can be applied by chemical vapor deposition or by a physical vapor deposition process to thicknesses as previously set forth. A thin layer of silica, however, may be subject to deterioration in a hydrous atmosphere so that additional layers must be applied to protect the silica from deterioration.

In one embodiment of the present invention, an intermediate layer 107 is applied over inner layer 106. Intermediate layer 107 may include a plurality of sublayers. The first sublayer 108 of the intermediate layer 107 preferably contains mullite ($3Al_2O_3 \cdot 2SiO_2$), over which is deposited a second sublayer 110 of an alkaline earth metal aluminosilicate, preferably barium strontium aluminosilicate (BSAS). Separating the BSAS sublayer 110 and the YSZ top coat 114 is a third sublayer 112 that consists of mullite, YSZ, alumina, and/or an alkaline earth metal aluminosilicate (again, preferably BSAS) and combinations thereof. The third sublayer 112 promotes the ability of the T/EBC system to thermally and environmentally protect the silicon containing substrate 104 over numerous thermal cycles and at elevated temperatures.

The mullite sublayer 108 can serve as a bond coat to adhere the BSAS sublayer 110 and the third sublayer 112 to the inner layer 106 and the silicon containing substrate 104, while also preventing interactions between the BSAS sublayer 110 and the silica layer 106 and the silicon-containing substrate 104 at high temperatures. Mullite is a suitable material for the first sublayer 108 because of its chemical stability, particularly silicon containing materials such as a silica inner layer 106, at high temperatures. A suitable thickness range for the mullite sublayer 108 is about 25 to about 250 µm (about 0.001 to about 0.010 inch), depending on the particular application.

The BSAS sublayer 110 overlying the mullite sublayer 108 provides excellent environmental protection and exhibits good thermal barrier properties due to its low thermal conductivity. Particularly, BSAS is able to serve as an environmental barrier to the underlying mullite sublayer 108 and an inner layer 106 of silica, which would exhibit significant silica activity and volatilization if exposed to a hydrous environment at high temperatures. The BSAS sublayer 110 prevents decomposition of the mullite in sublayer 108 into its constituent components, which decomposition would then adversely affect the silica layer 106. In addition, BSAS is relatively compatible with the mullite sublayer 108 in terms of coefficient of thermal expansion (CTE). A suitable thickness range for the BSAS sublayer 110 is about 125 to about 500 µm (about 0.005 to about 0.020 inch), depending on the particular application. BSAS typically is comprised of 0.00 to about 1.00 moles of BaO, 0.00 to about 1.00 mole of an oxide of a second alkaline earth metal such as SrO, about 1.00 moles of $Al_2O_3$, about 2.00 mole of $SiO_2$ and wherein the total of the BaO and the second alkaline earth metal is about 1.00 mole. The BSAS sublayer is applied by thermal spraying in the temperature range of about 400–2200° F. (200–1200° C.).

The composition of the third sublayer 112 may vary broadly. In one embodiment, the third sublayer 112 is a substantially homogeneous mixture of YSZ and BSAS, mullite and/or alumina, and YSZ, with YSZ constituting up to 90 weight percent of sublayer 112.

Alternatively, sublayer 112 can be divided up into further discrete sublayers, each with a different composition of BSAS, mullite, YSZ and alumina, having varying ratios. In this second embodiment, the composition of the innermost surface of sublayer 112 contacting the BSAS sublayer 110 is BSAS-rich, preferably essentially BSAS, mullite and/or alumina, while the outermost surface of sublayer 112 contacting the YSZ top coat 114 is YSZ-rich, preferably essentially YSZ. The compositions between the innermost and outermost surfaces of sublayer 112 and than increasingly higher YSZ-content approaching the outermost sublayer.

In the third embodiment, third sublayer 112 has a graded composition, continuously changing from essentially all YSZ adjacent the YSZ topcoat 114 to essentially all BSAS, mullite and/or alumina adjacent the BSAS sublayer 110. In this embodiment, the YSZ-containing sublayer 112 has a decreasing concentration of BSAS, mullite and/or alumina and an increasing concentration of YSZ in a direction away from the BSAS sublayer 110. In combination, the higher concentration of BSAS, mullite and/or alumina adjacent the BSAS sublayer 110, that is, a higher volume fraction of BSAS, mullite and/or alumina, and the higher concentration of YSZ adjacent the YSZ top coat 114, that is a higher volume fraction of YSZ, serve to provide a gradually increasing CTE, with a minimum CTE adjacent the BSAS sublayer 110, which corresponds to that of BSAS sublayer 110, and a maximum CTE adjacent the YSZ top coat 114, which very closely matches the CTE of the YSZ top coat 114.

A suitable thickness for the YSZ-containing sublayer 112 is up to about 500 µm (up to about 0.020 inch), depending on the particular application and the thickness of the other sublayers 108–110 and 114. High application temperatures, e.g., up to 2000° C., necessitate thick protective coating systems, generally on the order of 250 µm or more. It is with such coating systems that the benefits of the third sublayer 112 that includes become necessary to improve the mechanical integrity of the coating system. The YSZ constituent of this layer 112 serves to increase its overall CTE to a CTE that more closely matches the CTE of YSZ topcoat 114.

Advantages of using mullite, alumina or a mixture of these with YSZ in the YSZ-containing sublayer 112 include a higher temperature capability as compared to BSAS. Simultaneously, a mixture of BSAS and YSZ in sublayer 112 provides a sublayer having an intermediate CTE between the overlying YSZ layer 114 and underlying BSAS sublayer 110, so that there is less tendency for spalling to occur.

As with prior art bond coats and environmental coatings, the sublayers 108–112 can be individually deposited by air and vacuum plasma spraying (APS and VPS, respectively), though it is foreseeable that deposition could be performed by other known techniques, such as chemical vapor deposition (CVD) and high velocity oxy-fuel (HVOF). The YSZ topcoat 114 can also be deposited by known techniques, including plasma spraying and physical vapor deposition (PVD) techniques. Thereafter, a heat treatment may be performed after deposition of the individual layers 106–112 and/or YSZ topcoat 114 to relieve residual stresses created during cooling from elevated deposition temperatures.

BSAS is applied in thicknesses of 0.5 mils to about 30 mils by a thermal spray process and forms a substantially crack-free crystallographic structure. Mullite, which is also applied by a thermal spray process, tends to crack. This tendency of mullite to crack can be overcome by carefully controlling process parameters, as is taught in the prior art. But mullite has high $SiO_2$ activity and can deteriorate in hydrous environments. The tendency of mullite to crack can also be reduced when applied as a mixture in combination with BSAS, although it may also be mixed with calcium aluminosilicate, or yttrium silicate. Thus, when mullite alone is used as one of the sublayers in the intermediate layer, an additional sublayer of BSAS is typically applied over the mullite to act as a diffusion barrier and protect it from deterioration.

It is desirable to heat treat the substrate coated with the coating system of the present invention to a temperature of about 2280° F. (1250° C.) for about 24 hours. Not only does this stress relieve the structure and promote bonding between the layers and among the as-sprayed powders of the individual layers, but also it assists in developing the BSAS as a crystalline phase.

Figure 2:
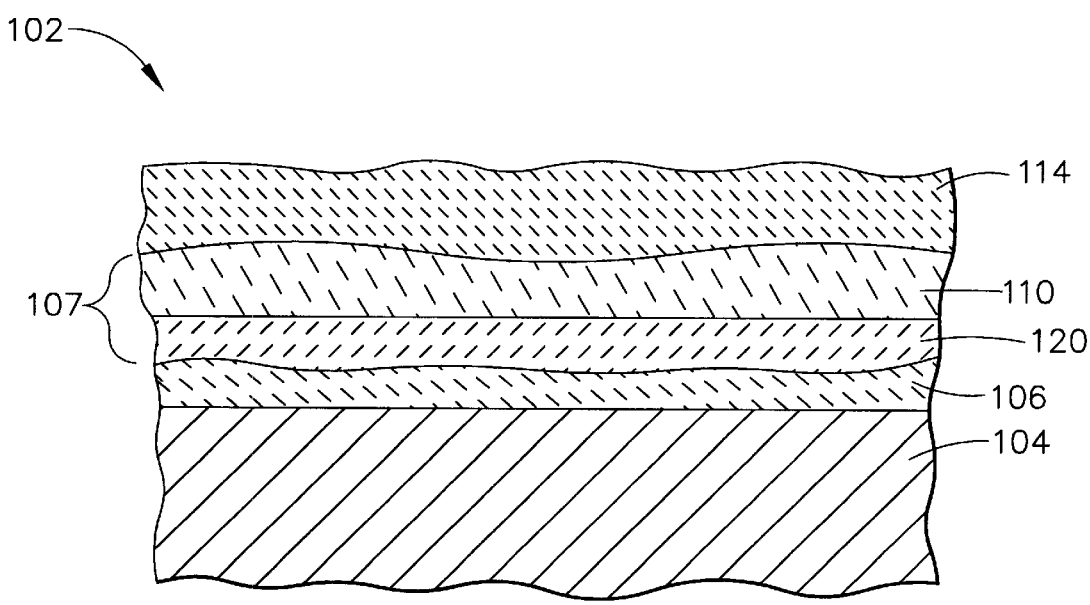
FIG. 2 is a turbine component with a second embodiment of the coating system of the present invention.

FIG. 2 illustrates another embodiment of the coating system of the present invention. The coating system illustrated in FIG. 2 has an inner oxide layer 106, silica, overlying the CMC substrate 104 and a YSZ top coat 114 as described above with regard to FIG. 1. The coating system illustrated in FIG. 2 has an intermediate layer 107 that includes a first sublayer 120 that contains a combination of mullite and BSAS for less demanding applications, e.g., temperatures below about 1300° C. The addition of BSAS to the mullite in the first intermediate layer 20 is also relatively compatible with the silica layer 106 in terms of CTE. Overlying the first sublayer 120 is a second sublayer 110. The second sublayer 110 is an alkaline earth metal aluminosilicate, preferably barium strontium aluminosilicate (BSAS). The YSZ topcoat 114 then overlies the BSAS layer 110.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An article for use in a hot section of a gas turbine engine, comprising:
   a non-metallic CMC substrate;
   an inner layer of silica having a low diffusivity of oxygen applied over the non-metallic substrate;
   an intermediate layer applied over the layer of silica, the intermediate layer comprised of a plurality of sublayers, at least one of said sublayers being a material that protects the inner layer of silica from contact with molecules of water; and
   a thermal barrier coating applied over the intermediate layer.

2. The article of claim 1 wherein the intermediate layer includes a first sublayer of a material selected from the group consisting of mullite, barium strontium aluminosilicate and mixtures thereof.

3. The article of claim 2 wherein the intermediate layer includes a second sublayer of barium strontium aluminosilicate applied over the first sublayer.

4. The article of claim 3 wherein the thermal barrier coating is a zirconia stabilized with at least one oxide selected from the group consisting of hafnium, Group IIA elements, Group IIIA elements and the lanthanide series elements.

5. The article of claim 4 wherein the CMC substrate is selected from the group consisting of metal matrix composites reinforced with silicon carbide, metal matrix composites reinforced with silicon nitride, composites having a matrix of silicon carbide, composites having a matrix of silicon nitride, composites with a silicon carbide matrix reinforced with silicon carbide, composites with a silicon nitride matrix reinforced with silicon carbide, composites with a silicon carbide matrix reinforced with silicon nitride and composites with a silicon nitride matrix reinforced with silicon nitride.

6. The article of claim 3 wherein the intermediate layer includes a third sublayer applied over the second sublayer, the thermal barrier coating being a thermal-insulating material applied over the third sublayer.

7. The article of claim 6 wherein the third sublayer includes a thermal-insulating material and at least one material selected from the group consisting of mullite, alumina and alkaline earth metal aluminosilicates.

8. The article of claim 7 wherein the CMC substrate is selected from the group consisting of metal matrix composites reinforced with silicon carbide, metal matrix composites reinforced with silicon nitride, composites having a matrix of silicon carbide, composites having a matrix of silicon nitride, composites with a silicon carbide matrix reinforced with silicon carbide, composites with a silicon nitride matrix reinforced with silicon carbide composites with a silicon carbide matrix reinforced with silicon nitride, and composites with a silicon nitride matrix reinforced with silicon nitride.

9. The article of claim 8 wherein the first sublayer of the intermediate layer is mullite.

10. The article of claim 9 wherein the second sublayer of the intermediate layer is an alkaline earth metal aluminosilicate applied over the first sublayer.

11. The article of claim 10 wherein the second sublayer is barium strontium aluminosilicate.

12. The article of claim 11 wherein the thermal-insulating material is yttria-stabilized zirconia.

13. The article of claim 12 wherein the third sublayer comprises a first portion contacting the second sublayer and having a substantially uniform composition of at least one material selected from the group consisting of barium strontium aluminosilicate, mullite and alumina and a second portion contacting the thermal barrier coating having a substantially uniform composition of yttria-stabilized zirconia mixed with at least one material selected from the group consisting of barium strontium aluminosilicate, mullite and alumina.

14. The article of claim 12 wherein the third sublayer is compositionally graded, the third sublayer consisting essentially of at least one of barium strontium aluminosilicate, mullite and alumina at an interface of the third sublayer with the second sublayer, and consisting essentially of yttria-stabilized zirconia at an interface of the third sublayer with the thermal barrier coating, the third sublayer having a decreasing concentration of the at least one of barium strontium aluminosilicate, mullite and alumina and an increasing concentration of yttria-stabilized zirconia in a direction away from the second sublayer.

15. The article of claim 1 wherein the inner layer is applied to a thickness of between about 1 microns to about 125 microns.

16. The article of claim 2 wherein the first sublayer of the intermediate layer is applied to a thickness of between about 0.001 inches (25 microns) to about 0.010 inches (250 microns).

17. The article of claim 3 wherein the second sublayer of the intermediate layer is applied to a thickness of between about 0.005 inches (125 microns) to about 0.020 inches (500 microns).

18. The article of claim 6 wherein the third sublayer is comprised of up to 90% by weight YSZ and the balance a material selected from the group consisting of alumina, mullite and BSAS and combinations thereof.

19. An article for use in a hot section of a gas turbine engine, comprising:
   a non-metallic CMC substrate;
   an inner layer of silica having a low diffusivity of oxygen applied over the non-metallic substrate, wherein the inner layer of silica is applied by a process selected from the group consisting of CVD, sol-gel, physical vapor deposition and plasma spray;
   an intermediate layer applied over the layer of silica, the intermediate layer comprised of a plurality of sublayers, at least one of said sublayers being a material that protects the inner layer of silica from contact with molecules of water, wherein at least one of the sublayers being applied by a process selected from the group consisting of HVOF, air plasma spray, vacuum plasma spray and CVD; and
   a thermal barrier coating applied over the intermediate layer, wherein the thermal barrier coating is applied by a process selected from the group consisting of plasma spraying and physical vapor deposition.

20. The article of claim 19 wherein the non-metallic CMC substrate is comprised of at least one component that includes silicon.

21. The article of claim 19 wherein the non-metallic CMC substrate is comprised of at least one component selected from the group consisting of silicon carbide and silicon nitride.

22. The article of claim 19 wherein the intermediate layer is further comprised of a first sublayer of mullite overlying the inner layer, a second sublayer of BSAS overlying the first sublayer and a third sublayer formed of at least two materials selected from the group consisting of mullite, stabilized zirconia, alumina and BSAS.

23. The intermediate layer of claim 22 wherein the first sublayer is applied to a thickness of about 0.001–0.010 inches.

24. The intermediate layer of claim 22 wherein the third sublayer is formed of a mixture of at least two materials selected from the group consisting of mullite, stabilized zirconia, alumina and BSAS.

25. The intermediate layer of claim 22 wherein the third sublayer is formed of a plurality of discrete sublayers, each discrete sublayer having a substantially uniform composition through a preselected thickness, the composition selected from the group of materials consisting of mullite, stabilized zirconia, alumina and BSAS, and combinations thereof.

26. The intermediate layer of claim 22 wherein the third sublayer is formed of a graded composition comprising at least BSAS and stabilized zirconia, with the at least BSAS further comprising a high volume fraction of the third sublayer adjacent the second sublayer and stabilized zirconia comprising a high volume fraction of the third sublayer adjacent the thermal barrier coating.

* * * * *